| United States Patent [19] | [11] 4,104,241 |
|---|---|
| Roberts et al. | [45] Aug. 1, 1978 |

[54] THERMOSETTING ADDITIVES FOR POLYESTER-BASED MOLDING COMPOUNDS

[75] Inventors: Michael G. Roberts, Heath; Carl R. Strauss; Charles E. Bolen, both of Newark, all of Ohio

[73] Assignee: Owens-Corning Fiberglas Corporation, Toledo, Ohio

[21] Appl. No.: 623,285

[22] Filed: Oct. 17, 1975

Related U.S. Application Data

[63] Continuation of Ser. No. 517,695, Oct. 24, 1974, abandoned.

[51] Int. Cl.$^2$ .................. C08K 7/14; C08L 67/06
[52] U.S. Cl. .................. 260/40 R; 260/862; 260/873; 260/875; 260/885; 260/886

[58] Field of Search .................. 260/873, 862, 40 R

[56] References Cited

U.S. PATENT DOCUMENTS

| 2,610,961 | 9/1952 | Burnett | 260/873 |
| 3,673,148 | 6/1972 | Vasta | 260/862 |

*Primary Examiner*—Allan Lieberman
*Attorney, Agent, or Firm*—Ronald C. Hudgens; Philip R. Cloutier; Dennis M. Kozak

[57] ABSTRACT

A thermosetting additive comprising, in its preferred form, the 2-hydroxyethyl acrylate adduct of poly(styrene-co-maleic anhydride), is blended with polyester-based thermosetting resins to produce molding compounds having improved surface characteristics.

18 Claims, No Drawings

THERMOSETTING ADDITIVES FOR POLYESTER-BASED MOLDING COMPOUNDS

Reference is hereby made to copending application. This application is a cont. of Ser. No. 517,695 filed Oct. 24, 1974, now abandoned.

This invention pertains to thermosetting additives for polyester-based molding compounds.

In one of its more specific aspects, this invention relates to the incorporation of a thermosetting additive into thermosetting, polyester-based molding compounds for the purpose of improving the surface characteristics of the molded product.

Molding compounds comprising polymerizable, unsaturated polyesters in sheet and bulk form are well known. Generally, these compounds comprise a polymerizable, unsaturated polyester and at least one copolymerizable, ethylenically unsaturated monomer capable of copolymerizing with the unsaturated polyester to form a thermoset composition. Such compounds contain crosslinking catalysts, gelling agents, mold release agents, fillers, plasticizers, pigments, and the like. The copolymerization takes place upon the application of heat during molding.

Most polyester-based thermosetting resins tend to undergo shrinkage when molded. To decrease shrinkage and to improve surface characteristics such as sink and gloss, thermoplastic resins are frequently incorporated into the thermosetting resin. It has not, however, been the practice to incorporate a thermosetting resin into the thermosetting, polyester-based molding compound to effect such improvements.

This invention provides thermosetting additives for incorporation into thermosetting, polyester-based molding compounds for the purpose of improving surface characteristics of the molded compound.

According to the present invention, there is provided a thermosetting unsaturated terpolymer which can be employed as a component of polyester-based molding compounds for the purpose of improving surface characteristics of molded products formed from the molding compound. This polymer is, preferably, the 2-hydroxyethyl acrylate adduct of poly(styrene-co-maleic anhydride).

Also according to this invention there is provided a molding composition comprising a polymerizable unsaturated polyester resin, a thermosetting, unsaturated terpolymer and at least one ethylenically unsaturated monomer capable of polymerizing with said unsaturated polyester resin and with said unsaturated terpolymer to form a thermoset resin upon molding.

Also according to this invention, there is provided a method of improving at least one surface characteristic of a polyester-based molding compound comprising a thermosetting polyester and an ethylenically unsaturated monomer which method comprises incorporating into said compound a thermosetting, unsaturated terpolymer capable of polymerizing with the thermosetting polyester and the monomer to form a thermosetting matrix, the terpolymer being employed in an amount sufficient to improve at least one surface characteristic of the molded compound.

The moldable composition of this invention will be comprised, preferably, of the following components:

(a) an unsaturated, crosslinkable polyester resin in an amount within the range of from about 55 to about 80 parts by weight of total resin. The polyester resin will be employed in the form of a monomer-containing syrup having a solids or resin content of approximately 33 percent by weight. The polyester resin will have an acid value within the range of from about 15 to about 45, and preferably about 35, and a molecular weight within the range of from about 1,500 to about 2,500;

(b) the after-defined adduct or terpolymer, in an amount of from about 20 to about 45 parts by weight per 100 parts by weight of total resin;

(c) an ethylenically unsaturated monomer in which the adduct is soluble;

(d) a mold release agent in an amount within the range of from about 0.5 to about 4 parts by weight per 100 parts by weight of total resin;

(e) one or more fillers in an amount within the range of from about 25 to about 180 parts by weight per 100 parts by weight of total resin;

(f) a crosslinking catalyst in an amount within the range of from about 0.1 to about 3 parts by weight per 100 parts by weight of total resin; and, (g) a gelling agent in an amount within the range of from about 0.5 to about 1.5 parts per hundred parts of total resin.

The unsaturated polyesters which can be employed in this invention are the poly-condensation products of at least one $\alpha,\beta$ ethylenically unsaturated dicarboxylic acid (which term, as used herein, includes the corresponding anhydrides) and dihydric alcohol or oxides.

Suitable unsaturated dicarboxylic acids include maleic anhydride, fumaric acid, itaconic acid, citraconic acid and chloromaleic acid, and the like, and mixtures thereof. Preferred materials are maleic anhydride and fumaric acid. While a minor proportion of the unsaturated dicarboxylic acid, that is, up to about 25 mole percent, can be replaced by saturated carboxylic acids such as succinic, adipic and sebacic acids, and their mixtures, it is preferred that no saturated dicarboxylic acids be used.

Suitable dihydric glycols and oxides which can be employed include 1,2-propanediol, dipropylene glycol, ethylene glycol, diethylene glycol, 1,3-butanediol, 1,4-butanediol, neopentyl glycol, triethylene glycol, tripropylene glycol, ethylene oxide and the like, and mixtures thereof.

The unsaturated polyester will be soluble in the after-defined monomers in which it will be crosslinkable during the molding process to a thermoset matrix.

The monomer will be one which is copolymerizable with the unsaturated polyester and the maleic anhydride-based unsaturated terpolymer to produce a crosslinked, thermoset matrix. The monomer will be a liquid monomer, or mixture of monomers, having at least one polymerizable reactive, ethylenically unsaturated (>C=C<) group per molecule. The monomer system can be chosen from the group consisting of styrene, substituted styrenes such as vinyl toluene, tert-butyl styrene, lower (i.e., $C_2$ to $C_4$) alkyl esters of acrylic and methacrylic acids, a-methyl styrene, cyclic acrylates, methacrylates such as cyclohexyl methacrylate and acrylate, benzyl methacrylate and acrylate and the like, bicyclic methacrylates and acrylates such as isobornyl methacrylate and acrylate, halogenated styrenes such as chlorostyrene, dichlorostyrenes, 1,3-butanediol dimethacrylate, diallyl phthalate and the like, and mixtures thereof.

The mold release agents which can be used in this invention are those well known in the art and include stearates of zinc, calcium aluminum and the like.

Various types and concentrations of fillers can be employed in the present invention, these including clay, talc, mica, calcium carbonate, silicas, carbon black, glass fibers, and the like, and mixtures thereof. In the composition of the present invention, calcium carbonate and chopped glass fibers are employed in the preferred embodiment.

The crosslinking catalysts are such as are conventionally employed. These comprise free radical catalysts which do not degrade until molding temperatures are attained but which provide fast cure after gelation. Among the catalysts which can be employed are benzoyl peroxide, tert-butyl perbenzoate, tert-butyl peroxide, tert-butyl peroctoate, lauroyl peroxide, and the like.

The gelling agents employable in this invention are such as are used in the prior art and include calcium hydroxide and magnesium hydroxide. In the preferred embodiment of the invention, calcium hydroxide is employed in an amount within the range of from about 0.7 to about 1.2 parts per 100 parts of resin.

The unsaturated terpolymer which is employed in this invention is a resin comprising the adduct of (1) a polymer formed from a liquid monomer having at least one polymerizable reactive, ethylenically unsaturated (>C=C<) group per molecule and an unsaturated dicarboxylic acid (or corresponding anhydride) selected from the group consisting of maleic anhydride, fumaric acid, itaconic acid, citraconic acid and chloromaleic acid and (2) a hydroxy-alkyl unsaturated monomer having the formula

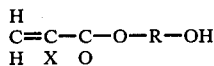

wherein X can be hydrogen or methyl and R is an alkyl group containing from 1 to about 10 carbon atoms.

The monomer will be as previously described as employed in the production of the polyester. The monomer system can be chosen from the group consisting of styrene, substituted styrenes such as vinyl toluene, tert-butyl styrene, lower (i.e., $C_2$ to $C_4$) alkyl esters of acrylic and methacrylic acids, a-methyl styrene, cyclic acrylates, methacrylates such as cyclohexyl methacrylate and acrylate, benzyl methacrylate and acrylate and the like, bicyclic methacrylates and acrylates such as isobornyl methacrylate and acrylate, halogenated styrenes such as chlorostyrene, dichlorostyrene, 1,3-butanediol dimethacrylate, diallyl phthalate and the like and mixtures thereof. In the preferred embodiment of this invention, the monomer will be styrene.

Examples of suitable hydroxy-alkyl unsaturated monomers include hydroxyethyl acrylate, hydroxyethyl methacrylate, hydroxypropyl acrylate, hydroxypropyl methacrylate. Also employable are allyl alcohol and N-methylolacrylamide. In the preferred embodiment of this invention 2-hydroxyethyl acrylate will be employed.

The terpolymer will be formed from about 70 to about 99 weight percent of the first monomer, from about 0.5 to about 15 weight percent of the unsaturated dicarboxylic acid and from about 0.5 to about 19 weight percent of the hydroxy alkyl unsaturated monomer. The terpolymer, or adduct, will have a molecular weight within the range of from about 10,000 to about 1 million and an acid number within the range of from about 0.1 to about 8.0.

While not meaning to be limited by any theory, the adduct of this invention acts as a polymer having a saturated backbone pendant from which, at intervals, is vinyl, alkenyl, acrylic, or the like, unsaturation. When this adduct is incorporated into the polyester resin, the adduct behaves as a true thermosetting polymer with the unsaturated groups crosslinking into the polyester-monomer matrix. However, because of the interspersed unsaturated groups, there remains in the thermosetting adduct sufficient thermoplastic characteristics such that the molded product evidences low shrink and low profile. Relatedly, it would appear that the adduct exists in the form of the maleic half-acid which enables the uncured thermoset adduct to participate in the thickening process. That the adduct is of a thermosetting nature is demonstrated by data which follow.

Without meaning to limit the invention, the invention will hereinafter be described in terms of its preferred embodiment in which the adduct is produced employing 2-hydroxyethyl acrylate.

The adduct of this invention is prepared in two steps. In the first step a polymer is produced from maleic anhydride and styrene which are reacted in the presence of a free radical initiator, such as benzoyl peroxide, the initiator being employed in an amount within the range 0.05 to about 0.1 parts by weight per 100 parts by weight of styrene. The reaction is preferably carried out at atmospheric pressure at a temperature within the range of from about 50° C to about 90° C. When the reaction mixture has attained a solids content of about 30 to 40 weight percent, the reaction is terminated by introducing an inhibitor, such as toluol hydroquinone, in an amount of about 0.05 parts by weight per hundred parts by weight of the reaction mixture. The copolymerization of the maleic anhydride and the styrene is facilitated if the maleic anhydride is dissolved in 10 to 15 weight percent of the styrene employed and the resulting solution is added to the styrene in the reactor, at reaction conditions, in a drop-wise manner over the period of the reaction. This method of addition further facilitates the desired distribution of the maleic anhydride along the backbone of the polymer.

In the second step, the acrylic double bonds are incorporated into the thermoplastic polymer produced in the first step. To the reaction mixture from the first step is added the 2-hydroxyethyl acrylate. A suitable amine catalyst, such as triethyl amine, is employed in an amount of about 0.05 parts by weight per hundred parts by weight of the total reaction mixture. The reaction is conducted at atmospheric pressure and a temperature within the range of from about 60° C to about 120° C. The reaction is conducted for a time sufficient to incorporate the 2-hydroxyethyl acrylate into the polymer and to produce the equivalent amount of the half-acid, the presence of which is determined by acid number determination, one mole of the hydroxyethyl acrylate being considered as forming one mole of the half acid upon the opening of the anhydride (O=C-O-C=O) portion of the ring.

This invention is demonstrated by the following examples.

EXAMPLE I

This example demonstrates the two-step procedure for the production of the thermosetting adduct.

In the first step, 740.5 grams of styrene and 1 gram of benzoyl peroxide were introduced into a flask. 18.4 grams of maleic anhydride were dissolved in 100 grams of styrene and the resulting solution was added to the contents of the flask after the contents thereof had reached 75° C. The solution was added to the flask over a period of 5½ hours. The temperature was maintained at about 75° C to 77° C for 20 minutes at which time the solids content of the reaction mixture had reached about 38.4 weight percent. Toluhydroquinone in an amount of about 0.49 was then introduced into the flask and the contents thereof were allowed to cool.

The reaction product had an acid number of about 10 and a molecular weight of about 160,000.

In the second step, 758g. of the resin prepared in the first step, above, were introduced into a flask and the contents of the flask were heated to 50° C. To the reaction mixture was then added 19.5g. of 2-hydroxyethyl acrylate and 0.3 ml. triethylamine. The mixture was heated to 70° C at which temperature an exotherm occurred which raised the temperature to 74° C. After the temperature had dropped to 71° C, the temperature was raised to 75° C at which temperature the reaction mixture was held for about 1 hour. Thereafter, the reaction mixture was allowed to cool. The polymer had an acid number of 5 and a molecular weight of 160,000.

EXAMPLE II

The following example demonstrates that the product formed by the two-step procedure of Example I is a thermosetting polymer.

30g. of the reaction product of Example I, Step I and of Example I, Step II were placed in a vacuum oven at 60° C and 8.5g. of styrene were stripped from each sample.

20g. of each of the stripped resins was treated as follows:

| Resin | Treatment |
|---|---|
| 1. Example I, Step I | Add 0.65g. 2-hydroxyethyl acrylate |
| 2. Example I, Step II | None |
| 3. Example I, Step I | Cobalt Naphthenate |
| 4. Example I, Step II | Cobalt Naphthenate |
| 5. Example I, Step I | Methyl ethyl ketone peroxide |
| 6. Example I, Step II | Methyl ethyl ketone peroxide |

Two 2 inches × 2 inches × ⅛ inch squares of each of the six resins were cured between Mylar film and glass plates for two hours at room temperature, followed by curing for 3 hours at 80° C. The cured squares of resin were then immersed, individually, in methyl ethyl ketone, ethyl acetate and benzene for 3 hours at room temperature. The samples were weighed before and after immersion, if possible.

All samples derived from Example I, Step II retained their integrity although swollen with solvent. All samples derived from Example I, Step I could not be weighed inasmuch as they had become tacky and had insufficient integrity to allow handling.

Inasmuch as Resin 1, the resin of Example I, Step I, by addition, contained the same quantity of 2-hydroxyethyl acrylate as that of Example I, Step II, the above demonstrates that the polymer derived from Example I, Step II had the 2-hydroxyethyl acrylate incorporated therein to produce a resin crosslinked to a thermoset condition upon curing.

Further, since it is recognized that crosslinked resins are not soluble in the above solvents, the foregoing illustrates that the resin derived from Example I, Step II is a crosslinked, thermosetting resin of the type described above.

EXAMPLE III

Further illustrative of the thermosetting nature of the terpolymer composition of this invention are the gel-time evaluations presented below.

Sample I was the styrene-maleic anhydride polymer as formed in Example I, Step I, that is, it was the precursor of the terpolymer composition of this invention.

Sample II was the terpolymer composition of this invention as formed in Example I, Step II.

Gel times were as follows, based upon the average of two determinations.

|  | Sample I | Sample II |
|---|---|---|
| 150° to 190° F | 7 min. 2 sec. | 8 min. 38 sec. |
| 150° F - peak exotherm | 8 min. 54 sec. | 10 min. 25 sec. |
| Peak Exotherm, ° F. | 432 | 438 |

The above data indicate that the terpolymer composition produced in Example I, Step II, is a crosslinked, thermosetting resin of the type described above.

EXAMPLE IV

A series of molding compounds was produced by blending, individually, a plurality of thermoplastics and the thermosetting adduct of this invention with a thermosetting polyester resin syrup produced from the following materials substantially in the following manner.

| Materials | Parts by Weight |
|---|---|
| Propylene Glycol | 578.2 |
| Maleic Anhydride | 674.4 |
| Toluhydroquinone (25% Solution in styrene) | 6.8 |

The polyester resin syrup was prepared by charging all of the propylene glycol and one-third of the maleic anhydride into the reactor while using a continuous nitrogen sparge. The temperature of the contents of the reactor was raised to 190° F and about 4 hours after the first distillate, about one-half of the toluhydroquinone solution was added. When the reactor contents reached an acid value of about 35, the remainder of the toluhydroquinone solution was added. Thereafter, the remainder of the maleic anhydride was added at a rate of 10 to 15 parts per minute. The material in the reactor at this point had an acid number of 29 to 32 and 2 parts of the reactor contents diluted with one part of styrene had a viscosity of 21 to 25 at 350° F. (SSU)

The contents of the reactor were cooled to 340° F and diluted with styrene in an amount of 90 parts of reactor contents to 10 parts of styrene to produce a composition stable for 30 minutes at 120° C before gelling.

In another vessel, 486.4 parts by weight of styrene and 0.125 part by weight of mono-tertiary butyl hydroquinone were mixed and held at a temperature within the range of 130° to 145° F. Thereafter, 1,138 parts of polyester resin, produced as described above and at a temperature of about 330° F, were added to the styrene-hydroquinone mixture to produce a thinned polyester syrup which, at a temperature of 180° F, had a viscosity in the range of 1500 to 2000 cps., a maximum water content of about 0.08 weight percent and a monomer content within the range of about 30 to about 34 percent by weight.

This thermosetting polyester was blended, individually, with a plurality of thermoplastic additives and the terpolymer of this invention as produced in Example I.

Nine thermoplastic additives were produced, employing the materials set forth in Table I. In each instance, all materials except the toluhydroquinone were charged to the reactor. The contents of the reactor were purged with nitrogen while being heated to 70° C, (except additive II, to 80° C), which temperature was maintained until a solids content of about 33.3% was attained. Thereupon, the toluhydroquinone was added to the reactor contents, the contents were allowed to cool and the thermoplastics were individually recovered.

TABLE I

| Additive | I | II*** | III | IV | V | VI | VII | VIII | IX |
|---|---|---|---|---|---|---|---|---|---|
| Styrene | 900 | 925 | 925 | 1000 | 983.3 | 840.5 | 915 | 1000 | 933.4 |
| Acrylic Acid | 12.5 | 12.5 | 12.5 | 12.5 | 12.5 | — | 12.5 | 12.5 | 12.5 |
| Solprene 1206* | — | 75 | 75 | — | — | — | 85 | — | — |
| Maleic Anhydride | — | — | — | — | — | 22.7 | — | — | — |
| Azo-bis isobutyronitrile | 1.5 | — | — | — | 1.5 | — | — | — | 1.5 |
| 2-hydroxyethyl acrylate | 100 | — | — | — | 16.7 | — | — | — | 88.6 |
| Toluhydroquinone | 0.4 | 0.4 | 0.4 | 0.4 | 0.4 | 0.4 | 0.4 | 0.4 | 0.4 |
| Benzoyl peroxide | — | 1.5 | 1.5 | — | — | 1.0 | 1.5 | 1.5 | — |
| Percadox 16** | — | — | — | 1.5 | — | — | — | — | — |
| Dodecyl mercaptan | — | — | — | — | — | — | — | 0.2 | — |

*25/75 styrene-butadiene random polymer from Phillips Petroleum Co.
**bis (4-t-butyl cyclohexyl) peroxy dicarbonate from Moury Chemical Corp.
***Polymerized at 80° C.
Compositions in parts by weight.

Each of the nine thermoplastics additives and the thermosetting resin of this invention, as prepared in Example I, (additive X of Table II), were blended in the form of their syrups with the polyester resin syrup prepared in Example IV and with other ingredients to form molding compounds. The composition of the molding compounds was as follows:

| Ingredient | Parts by Weight |
|---|---|
| Polyester Resin Syrup | 340 |
| Additive Resin Syrup | 560 |
| t-butyl perbenzoate | 14 |
| Zinc Stearate | 52 |
| Calcium carbonate | 2079 |
| Magnesium hydroxide | 42 |
| Glass Fibers, ¼" length, chopped | 1542 |

In producing each molding compound, the two resin syrups, the t-butyl perbenzoate, the zinc stearate and the calcium carbonate were blended to form a smooth paste. The magnesium hydroxide was added to the paste and mixing was continued for two minutes. The chopped glass fibers were then added and the mixing was continued for an additional 2.5 minutes. Thereafter, the mixture was matured for approximately 48 hours at room temperature.

Each mixture was subsequently molded into a 12 inch × 18 inch flat sheet employing a molding pressure of approximately 1000 psi. at a platen temperature of 300° F at a cure cycle of 3 minutes. All sheets were then measured for shrink in relation to the cold mold.

Shrink data for the nine thermoplastic additives (I - IX) and for the thermosetting additive (X) of this invention, were as follows:

TABLE II

| Additive | Solids, Wgt. % | Shrink, mils/in. |
|---|---|---|
| I | 36.4 | 0.65 |
| II | 34.0 | 0.65 |
| III | 38.0 | 0.31 |
| IV | 21.3 | 0.46 |
| V | 34.4 | 0.61 |
| VI | 35.5 | 0.58 |
| VII | 36.0 | 0.31 |
| VIII | 33.0 | 0.73 |
| IX | 41.0 | 0.48 |
| X | 33.0 | 0.95 |

The polyester resin, when incorporated in substantially identical molding compounds, in the absence of the inclusion of an additive introduced for the purpose of reducing shrink, has a shrinkage of about 5 to 7 mils per inch. Molding compounds having a shrinkage of less than about 2.5 mils per inch are considered as being low shrink molding compounds.

From the above data, it will be seen that the terpolymer of this invention is effective in reducing the shrinkage of polyester resins when combined therewith, to within the limits of acceptable shrink values. The terpolymer is only slightly less effective in this respect than are those thermoplastic additives, such as are additives I, V and IX, in which as a result of bulk polymerization, the 2-hydroxyethyl acrylate is incorporated directly in the styrene-maleic anhydride chain.

It will be evident from the foregoing that various modifications can be made to the method of this invention. Such, however, are considered to be within the scope of the invention.

What is claimed is:

1. A method of improving the surface characteristics of a molded composition produced from a molding composition comprising a thermosetting unsaturated polyester resin, said method comprising incorporating into said polyester resin a resin comprising the adduct of:

1. a polymer formed from a liquid monomer selected from the group consisting of styrene, substituted styrenes, lower alkyl esters of acrylic anc methacrylic acids, cyclic acrylates and diallyl phthalate and an unsaturated dicarboxylic acid selected from the group consisting of maleic anhydride, fumaric acid, citraconic acid, chloromaleic acid and itaconic acid; and, 2. a hydroxy-alkyl unsaturated monomer having the formula

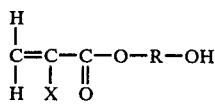

wherein X is hydrogen or methyl and R is an alkyl group containing from 1 to 10 carbon atoms, said adduct containing functional carboxylic acid groups, being capable of polymerizing with the thermosetting unsaturated polyester resin and being incorporated in said polyester in an amount sufficient to improve at least one surface characteristic of said molded composition.

2. The method of claim 1 in which said adduct is employed in an amount within the range of from about 20 to about 45 parts by weight per 100 parts by weight of total resin.

3. The method of claim 1 in which said adduct is the 2-hydroxyethyl acrylate adduct of poly(styrene-comaleic anhydride).

4. The method of claim 1 in which said hydroxy-alkyl unsaturated monomer is selected from the group consisting of hydroxyethyl acrylate, hydroxymethyl methacrylate, hydroxypropyl acrylate and hydroxypropyl methacrylate.

5. The method of claim 1 in which said hydroxy-alkyl unsaturated monomer is 2-hydroxyethyl acrylate.

6. The method of claim 1 in which said adduct is formed employing from about 70 to about 99 weight percent of said liquid monomer, of from about 0.5 to about 15 weight percent of said unsaturated dicarboxylic acid and from about 0.5 to about 19 weight percent of said hydroxy-alkyl unsaturated monomer.

7. The method of claim 1 in which said adduct has a molecular weight within the range of from about 10,000 to about 1 million and an acid number within the range of from about 0.1 to about 15.

8. The method of claim 1 in which said polyester resin is formed from propylene glycol and maleic anhydride.

9. The method of claim 1 in which said adduct is formed by introducing said hydroxy-alkyl unsaturated monomer into a reaction mixture comprising said polymer.

10. A composition of matter comprising:
a. a thermosetting unsaturated polyester resin; and,
b. an adduct of:
1. a polymer formed from a liquid monomer selected from the group consisting of styrene, substituted styrenes, lower alkyl esters of acrylic and methacrylic acids, cyclic acrylates and diallyl phthalate and an unsaturated dicarboxylic acid selected from the group consisting of maleic anhydride, fumaric acid, citraconic acid, itaconic acid and chloromaleic acid; and,
2. a hydroxy-alkyl unsaturated monomer having the formula

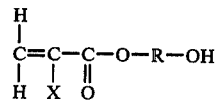

wherein X is hydrogen or methyl and R is an alkyl group containing from 1 to 10 carbon atoms and wherein said adduct is capable of polymerizing with the thermosetting unsaturated polyester.

11. The composition of claim 10 in which said adduct is present in an amount within the range of from about 20 to about 45 parts by weight or the total weight of said resin and said adduct.

12. The composition of claim 10 in which said adduct is the 2-hydroxyethyl acrylate adduct of poly(styrene-co-maleic anhydride).

13. The composition of claim 10 in which said hydroxy-alkyl unsaturated monomer is selected from the group consisting of hydroxyethyl acrylate, hydroxymethyl methacrylate, hydroxypropyl acrylate and hydroxypropyl methacrylate.

14. The composition of claim 10 in which said hydroxy-alkyl unsaturated monomer is 2-hydroxyethyl acrylate.

15. The composition of claim 10 in which said adduct is formed employing from about 70 to about 99 weight percent of said monomer, from about 0.5 to about 15 weight percent of said dicarboxylic acid and from about 0.5 to about 19 weight percent of said hydroxy-alkyl unsaturated monomer.

16. The composition of claim 10 in which said adduct has a molecular weight within the range of from about 10,000 to about 1 million and an acid number within the range of from about 0.1 to about 15.

17. The composition of claim 10 in which said polyester resin is formed from propylene glycol and maleic anhydride.

18. A composition comprising glass fibers and the composition of claim 10.

* * * * *